US006823251B1

(12) United States Patent
Giers

(10) Patent No.: US 6,823,251 B1
(45) Date of Patent: Nov. 23, 2004

(54) MICROPROCESSOR SYSTEM FOR SAFETY-CRITICAL CONTROL SYSTEMS

(75) Inventor: Bernhard Giers, Frankfurt am Main (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 479 days.

(21) Appl. No.: 09/403,115

(22) PCT Filed: Feb. 18, 1998

(86) PCT No.: PCT/EP98/00921

§ 371 (c)(1),
(2), (4) Date: Dec. 22, 1999

(87) PCT Pub. No.: WO98/48326

PCT Pub. Date: Oct. 29, 1998

(30) Foreign Application Priority Data

Apr. 18, 1997 (DE) .......................... 197 16 197

(51) Int. Cl.[7] .............................. G06F 7/00; B60T 8/88
(52) U.S. Cl. ............................. 701/76; 701/33; 701/70; 303/122; 303/122.05; 303/122.06; 714/12; 700/4; 700/20
(58) Field of Search ............................. 701/76, 70, 71, 701/92, 36, 29, 31, 33, 34; 303/122, 122.02, 176, 147, 149, 169; 714/30, 33, 12, 14, 10, 797, 820, 11, 24, 3; 700/2, 4, 81, 82, 7; 709/249, 234, 250, 213; 326/11, 38, 48; 710/26, 240

(56) References Cited

U.S. PATENT DOCUMENTS 3,665,173 A * 5/1972 Bouricius et al. ............. 714/11
4,672,530 A 6/1987 Schuss ........................... 700/4

(List continued on next page.)

FOREIGN PATENT DOCUMENTS

DE 30 24 370 1/1982
DE 32 25 455 1/1984

(List continued on next page.)

OTHER PUBLICATIONS

Search Report of the German Patent Office for Application No. 197 16 197.9.
Nikolaizik, Jürgen et al., Fehlertolerate Mikrocomputersysteme, *Technik* GmbH, Berlin, 1990, pp. 80–84, photos 5.25 and 5.26.
Smith, Steven, "Triple Redundant Fault Tolerance: A Hardware–Implemented Approach", *ISA*, 1991, vol. 30, No. 4, pp. 87–95.
Gudea, Denny et al., "Fault Tolerant Power Controller", *Proceedings of the Intersociety Energy Conversion Engineering Conference*, Washington, 1989, pp. 231–237.

Primary Examiner—Jacques H. Louis-Jacques
(74) Attorney, Agent, or Firm—Honigman Miller Schwartz & Cohn LLP

(57) ABSTRACT

A microprocessor system for safety-critical control operations includes at least three central units which are preferably located jointly on one chip and execute the same program. Further, there is provision of read-only memories and random-access memories with additional memory locations for test data, input and output units and comparators which check the output signals of the central units for correlation. The central units are interconnected by way of bus systems and bypasses which enable the central units to jointly read and process the existing data, including the test data and commands, according to the same program. The central units are extended by redundant periphery units into two complete control signal circuits and are interconnected in such a manner that, upon failure, the faulty central unit is identified by a majority decision and an emergency operation function is maintained.

16 Claims, 1 Drawing Sheet

U.S. PATENT DOCUMENTS

| | | | | |
|---|---|---|---|---|
| 4,726,024 A | * | 2/1988 | Guziak et al. | 714/24 |
| 4,967,347 A | * | 10/1990 | Smith et al. | 714/12 |
| 5,086,499 A | * | 2/1992 | Mutone | 714/3 |
| 5,295,258 A | * | 3/1994 | Jewett et al. | |
| 5,317,752 A | * | 5/1994 | Jewett et al. | |
| 5,388,230 A | * | 2/1995 | Yamada et al. | |
| 5,458,404 A | * | 10/1995 | Fennel et al. | 303/176 |
| 5,583,769 A | | 12/1996 | Saitoh | 701/79 |
| 5,819,025 A | * | 10/1998 | Williams | 714/30 |
| 5,841,990 A | * | 11/1998 | Picazo, Jr. et al. | 709/249 |
| 5,862,502 A | * | 1/1999 | Giers | 701/71 |
| 5,895,434 A | * | 4/1999 | Fennel et al. | 701/48 |
| 6,006,275 A | * | 12/1999 | Picazo, Jr. et al. | 709/249 |
| 6,128,687 A | * | 10/2000 | Dao et al. | 710/129 |
| 6,173,229 B1 | * | 1/2001 | Fennel et al. | 701/91 |

FOREIGN PATENT DOCUMENTS

| | | |
|---|---|---|
| DE | 32 34 637 | 3/1984 |
| DE | 38 25 280 | 2/1990 |
| DE | 41 22 016 | 1/1993 |
| DE | 41 36 338 | 5/1993 |
| DE | 41 37 124 | 5/1993 |
| DE | 43 41 082 | 6/1995 |
| DE | 35 33 849 | 10/1995 |
| DE | 44 39 060 | 5/1996 |
| DE | 195 09 150 | 9/1996 |
| DE | 195 29 434 | 2/1997 |
| EP | 0 346 804 | 12/1989 |
| EP | 0 399 308 | 11/1990 |

* cited by examiner

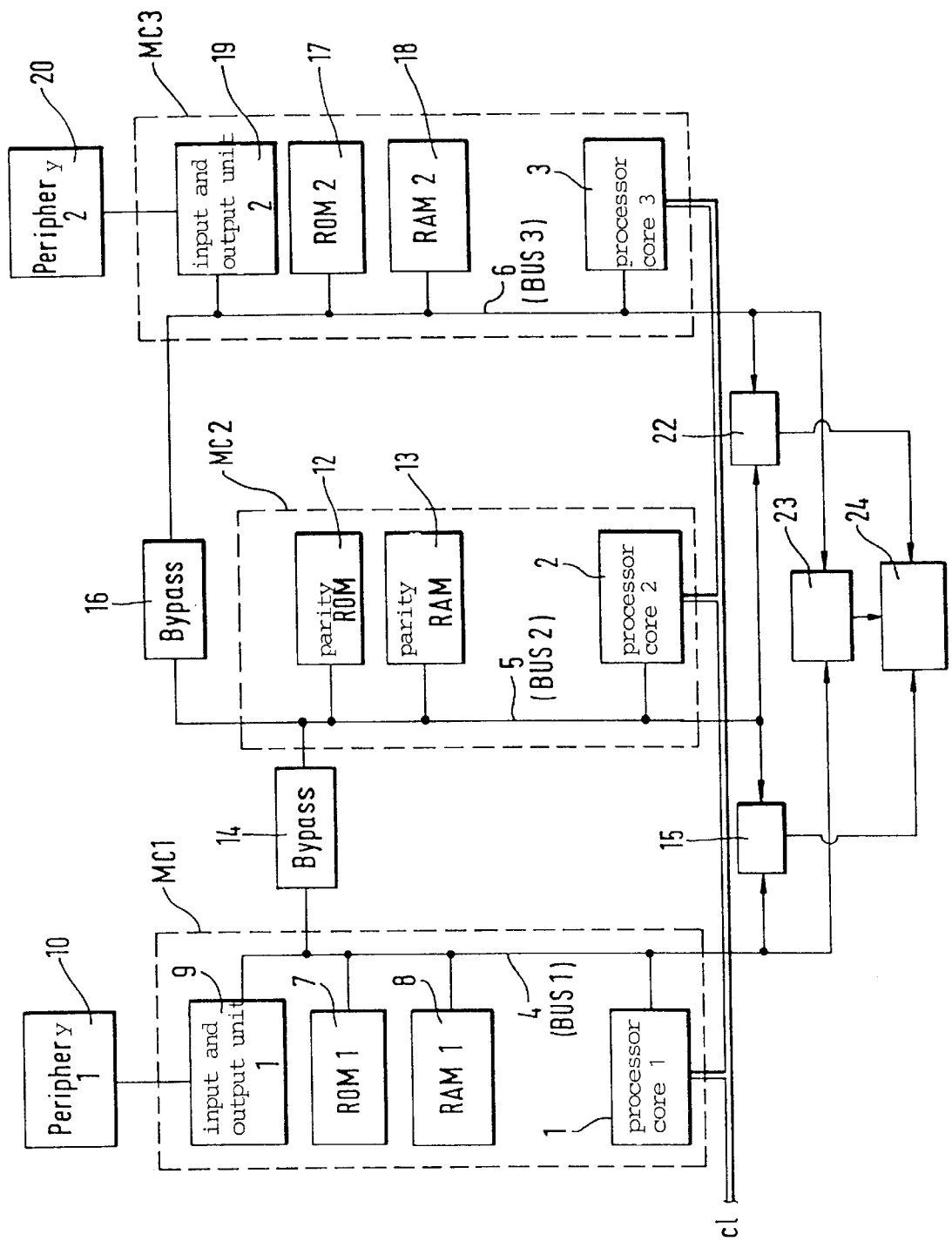

MICROPROCESSOR SYSTEM FOR SAFETY-CRITICAL CONTROL SYSTEMS

TECHNICAL FIELD

The present invention relates generally to vehicle safety systems and more particularly relates to a microprocessor system for safety-critical control operations.

BACKGROUND OF THE INVENTION

Safety-critical control operations of this type include, among others, control systems which intervene into the braking function of an automotive vehicle. These control systems are marketed in large quantities and marketed under many different designs. Examples are anti-lock systems (ABS), traction slip control systems (TCS), driving stability control systems (DSC, ASMS), suspension control systems, etc. Failure of any such control system jeopardizes the driving stability of the vehicle. Therefore, operability of the systems is constantly monitored in order to deactivate the control when a malfunction occurs, or to switch it to a default mode which is less dangerous.

Matters are even more critical for brake systems or automotive vehicle control systems where a switch-over to a mechanical or hydraulic system is not possible upon failure of the electronics. Among those systems are brake system concepts such as 'brake-by-wire' which are likely to gain in significance in the future. The braking function in such systems strongly depends on an intact electronics.

German patent No. 32 34 637 discloses one example of a circuit configuration or a microprocessor system for controlling and monitoring an anti-lock vehicle brake system. In this patent, the input data are sent in parallel to two identically programmed microcomputers where they are processed synchronously. The output signals and intermediate signals of the two microcomputers are compared for correlation by way of redundant comparators. In the event of non-correlation of the signals, the control is disconnected by a circuit which also has a redundant design. In this prior art circuit, one of the two microcomputers is used to produce the braking pressure control signals and the other one is used to produce the test signals. Thus, two complete microcomputers, including the associated read-only and random-access memories are required in this symmetrically designed microprocessor system.

According to another prior art system, the way the circuit described in German patent application No. 41 37 124 is designed, the input data are also sent in parallel to two microcomputers, only one of which executes the complete sophisticated signal processing operation. The main purpose of the second microcomputer is for monitoring the input signals, and, after conditioning the input signals, for producing time derivatives, etc., that can be processed further by way of simplified control algorithms and a simplified control philosophy. The simplified data processing is sufficient to generate signals which indicate the proper operation of the system by comparison with the signals processed in the more sophisticated microcomputer. The use of a test microcomputer of lower capacity permits reducing the manufacturing effort compared to a system with two complete sophisticated microcomputers of the same capacity.

German patent application No. 43 41 082 discloses a microprocessor system which is provided especially for the control system of an anti-lock brake system. The system known from the art which can be incorporated on one single chip comprises two central units in which the input data are processed in parallel. The read-only and the random-access memories which are connected to the two central units have additional memory locations for test information, each comprising a generator to produce the test information. The output signals of one of the two central units are further processed to produce the control signals, while the other central unit, being a passive central unit, is only used to monitor the active central unit.

Thus, the necessary safety is principally achieved by redundance of the data processing in the above-mentioned prior art systems. In the first case of application (German patent No. 32 34 637), the system is based on using two processors with identical software which the experts call a symmetrical redundance. In the second case of application (German patent application No. 41 37 124), two processors with a different software are used (so-called unsymmetrical redundance). It is principally also possible to utilize one single processor which processes the input data on the basis of different algorithms, and additional testing algorithms are then applied for determining faultless operation.

Finally, a system of the above-mentioned type is known from German patent application No. 195 292 434 (P 7959) which could be interpreted as a system with core redundance. In this prior art microprocessor system, two synchronously operated central units are provided on one chip or on several chips which have the same input information and execute the same program. The two central units are connected to the read-only and the random-access memories by way of separate bus systems as well as to input and output units. The bus systems are interconnected by drivers or bypasses, respectively, which enable both central units to jointly read and execute the data available, including the test data and commands. The system renders it possible to economize memory locations. Only one of the two central units is connected (directly) to a complete read-only and random-access memory, while the memory capacity of the second processor is limited to memory locations for test data (parity monitoring) in connection with a test data generator. Access to all data is possible by way of the bypasses. This makes it possible for both central units to execute the complete program.

All above-mentioned systems are principally based on the comparison of redundantly processed data and the generation of an error signal when differences appear. The control can be deactivated upon the occurrence of an error or malfunction of a system. An emergency operation function, i.e., continuing the control after the occurrence of the error, is in no case possible. Basically, such an emergency operation function would be possible only by doubling the redundant systems in connection with an identification and elimination of the source of errors.

An object of the present invention is to configure a microprocessor system of the above-mentioned type with as little additional effort and cost so that an emergency operation function becomes possible upon the occurrence of an error without impairing safety.

The special features of this system include that there is provision of at least three central units with associated bus systems which are extended by redundant periphery units into at least two complete control signal circuits and are interconnected in such a manner that, upon failure of a central unit or an associated component, the faulty central unit is identified by a majority decision and an emergency operation function is ensured, and the output or generation of control signals as a function of the faulty central unit is prevented. During the emergency operation function, preferably, redundant data processing and comparison of the data processing results for correlation is maintained and non-correlation of the data processing results is signaled.

Thus, the present invention is founded upon the above-mentioned system known from German patent application No. 195 29 434 which is principally composed of one complete and one incomplete data processing system, and extends this system by an additional complete data processing system with the associated periphery units. The result is two complete control signal circuits or control signal processing systems which are interconnected to provide a total system that achieves an emergency operation function and ensures maintaining the control with redundant data processing and, hence, with the necessary high degree of safety even upon failure of a processor or a central unit. This means that the interconnection of the individual systems or components according to the present invention permits maintaining the redundance of the data processing even upon failure of a processor.

The total number of memory locations needed which generally determines the price of the microprocessor system is only increased by little more than 100%, compared to processing in a non-redundant system, and the distribution and allocation of the memory locations to the individual processors is variable within wide limits. It must only be ensured that each individual processor or each individual processor unit can execute the full program and, further, has access to the test data or redundance data. In comparison to a non-redundant system, a double memory capacity plus some memory locations for the redundance data is required.

The configuration of the microprocessor system according to the present invention permits accommodating all or the main components, especially all central units, memories, comparators and bypasses as well as, if necessary, the input and output units, on one single chip.

According to an embodiment of the present invention, there is provision of three central units with each one bus system, and at least the double number of memory locations, compared to the memory locations required for a non-redundant system, are available for the read-only and random-access memories. By way of the bypasses, all central units are connected to the memory locations in the write and read directions and to all input and output units.

The three central units, along with the memories, the input and output units and the periphery units, including the voltage supply, etc., form two complete and one incomplete data processing systems in total. The memory locations required for a complete program run are distributed among two data processing systems, however. Favorably, each of the data processing systems comprises at least one central unit and one bus system as well as read-only and random-access memories and/or redundance information memories, and the memory locations are distributed among the individual data processing systems so that, upon the occurrence of an error and change-over to the emergency operation function, the intact systems have a sufficient number of memory locations for the complete data processing and for redundance information, and execute the complete program.

In another aspect of the present invention, at least the central units with the bus systems, the memories, the bypass units, the input and output units and some or all comparators are located on one joint chip.

BRIEF DESCRIPTION OF THE DRAWING

FIG. 1 is a schematically simplified view of the basic components of a microprocessor system of the present invention.

DETAILED DESCRIPTION OF THE PREFERRED EMBODIMENT

The drawing relates to a single-chip microcomputer system comprising three synchronously operated processors or central units 1, 2, 3 which are also referred to as computer cores or, due to their function, as processor cores. Associated with each processor is a bus system 4, 5, 6. The central units 1, 2, 3 are connected to a synchronous clock system cl (common clock) of a redundant design.

The central unit 1 or the processor core 1 is supplemented by a read-only memory 7 (ROM 1), a random-access memory 8 (RAM 1), and an input and output unit 9 to achieve a complete data-processing system or microcomputer MC1. The necessary periphery components (periphery 1) are represented by an external block 10. Among the periphery components is the voltage supply system, the delivery of the input signals (for example, the sensor signals in an automotive vehicle control system), and the actuator or valve actuation control, etc., by means of the output data or signals of the data processing systems.

A second, incomplete data processing system or microcomputer MC2 in which the central unit 2 is accommodated comprises only memory locations for test data or for the redundance function in the embodiment shown. Read-only memory locations 12 for a parity monitoring (parity ROM) and memory locations 13 for the redundance data in the read-only section (parity ROM) are represented in the interior of the microcomputer MC2. The pertinent test data generators or redundance generators are not illustrated for the sake of clarity.

BUS 1 (bus system 4) and BUS 2 (bus system 5) are cross connected by way of bus system 5 (BUS 2) and a bypass 14. Bypass 14 enables the central unit 1 to read the parity data stored in the memory locations 12, 13 and permits data flow from the memories 7, 8 and the processor core 1 of the microcomputer MC1 to the microcomputer MC2, especially to the central unit 2. This ensures a redundant execution of the complete data processing program by both central units 1, 2. Still further details about the design and the mode of operation of microprocessor systems of this type can be seen in the above-mentioned German patent application No. 195 29 434.

The data processing results of both systems MC1, MC2 or processors 1, 2 are monitored for correlation by means of a comparator 15, as has been explained in the above-mentioned application. The output signals of both processors shall be compared directly by way of a hardware comparator 15.

A general feature of the microprocessor system of the present invention and the embodiment shown in the drawing is that the above-described system disclosed in German patent application No. 195 29 434 is extended by another complete data processing system, i.e., by a microcomputer MC3 which also cooperates with the incomplete microcomputer MC2 and with the microcomputer MC1. Part of the functions of the additional microcomputer system (MC3), in particular, the storing of the read-only and the random-access data, however, can be transmitted to the second microcomputer system MC2 and also to the first system MC1 because the entire system, for ensuring the redundance function, requires only the double memory capacity, plus some memory locations for the redundance information, compared to a non-redundant system which executes the same program. The memory capacity must be distributed among the three data processing systems MC1, MC2, MC3 so that upon failure of one system, the remaining systems offer a sufficient memory location, i.e., at least 100% plus the redundance data. In the embodiment shown, each of the two microcomputer systems MC1 and MC3 is equipped with a memory capacity of 100% compared to the memory locations required for a non-redundant system, while the microcomputer system MC2 accommodates only few locations for the redundance data.

The third microcomputer system MC3 is interconnected to the (incomplete) microcomputer MC2 also by a bypass or a bypass unit 16. This bypass has the same function as the bypass 14, which has already been described in detail, and therefore enables also the central units 2 and 3 to redundantly process all input data.

The microprocessor system MC3 includes a read-only memory 17 (ROM 2), a random-access memory 18 (RAM 2), an input and output unit 19 and periphery components 20 (periphery 2). MC1 and MC3 are complete microcomputers in the embodiment shown, for which, however, a reduced memory capacity is sufficient, as has been explained hereinabove.

Data flow in both directions from BUS 1 (bus system 4) to BUS 3 (bus system 6) is possible by way of bypasses 14, 16. In order to further increase the fail safety, it might be expedient to establish a direct connection between the two bus systems 4, 6 (BUS 1 and BUS 3) by means of an additional bypass (which is not shown).

The microcomputer MC3 has the same design and the same components as microcomputer, MC1. Consequently, the microprocessor system according to the present invention includes two times the input and output units 9, 19 and the periphery components 20, 21 comprising the voltage supply, the sensor signal input and the actuator control.

The output signals or data processing results of the third microcomputer MC3 are checked for correlation with the results or output signals of the microcomputer MC2 or the central unit 2 by way of a comparator 22 and, equally, for correlation with the results of MC1 or the central unit 1 by way of the comparator 23. This renders possible not only detection of the fault, but also an identification of the system where the fault is located. In an identification stage 24 which is preferably redundant and to which the output signals of the comparators 15, 22, 23 are sent, the source of errors is identified by a majority decision, and the system is subsequently switched over to an emergency operation function. This means that the output of control signals as a function of faulty data processing results is prevented and switch-over to the intact system is effected instead. Utilization of the data processing results during the emergency operation function is therefore allowed in safety-critical control systems as well, because redundant data processing is continuously ensured even when an error occurs.

The system of the present invention can be achieved with comparatively low effort in manufacture. In comparison to the prior art system which does not permit an emergency operation, it is principally sufficient to add a processor core and to double the memory capacity. A classical solution with an emergency operation function would require at least three times the expenditure in memories. This is a major advantage because the costs of the entire system are dictated to a major extent by the size of the main memories (read-only and random-access memories).

There is minimum expenditure in the comparators 15, 22, 23 which perform an identification monitoring. The exchange of signals between the individual microcomputers by way of the bypasses necessitates no appreciable effort. A software for a seeming single-processor system is realized in terms of programming No software structures are required which achieve an exchange of signals between the microcomputers or check signals for equality or similarity.

It is principally also possible to have the fail-free circuit carry out the take-up of the input information and the signal output upon the occurrence of an internal computer error, or to instruct the fail-free circuit to do so. The result is further simplifications and system functions.

What is claimed is:

1. Microprocessor system for safety-critical control operations, comprising:

a plurality of central processing units which are connected, by way of separate bus systems, to read-only memories and random-access memories that also have memory locations for test data, wherein said plurality of central processing units are further connected to input and output units and to comparators which check the output data or output signals of the central processing units for correlation, wherein the central processing units execute the same program and communicate with each other by way of the bus systems, and wherein the bus systems are interconnected by bypasses which enable the central processing units to jointly read and process the existing data, including the test data and commands, redundant periphery units into at least two complete control signal circuits and are interconnected in such a manner that, upon failure of a central processing unit or associated components, the faulty central unit can be identified by a majority decision in an identification stage and an emergency operation function is maintained, wherein in the emergency operation function, redundant data processing and comparison of the data processing results for correlation is maintained and non-correlation or the occurrence of differences between the data processing results or intermediate results is signaled, and wherein a delivery of output signals or control signals by the inclusion of or as a function of the faulty system or the faulty central unit is prevented.

2. Microprocessor system as claimed in claim 1, wherein each central processing unit includes a bus system, and also includes other read only and random access memory having double the memory capacity, for the redundance data, compared to the memory capacity required for a non-redundant system, further by way of the bypasses there is a connection between all central processing units and the memory locations in the write and read directions and to all input and output units.

3. Microprocessor system as claimed in claim 2, wherein the three central processing units, along with the read only and random access memories, the input and output units and the periphery units, form two complete and one incomplete data processing systems in total.

4. Microprocessor system as claimed in claim 3, wherein, at least one of said three data processing systems further includes redundance information memories.

5. Microprocessor system as claimed in claim 1, wherein the data processing results or output signals of two central units are sent to comparators for comparing.

6. Microprocessor system as claimed in claim 5, wherein the central processing units with the bus systems, the read only and random access memories, the bypasses, the input and output units, comparators and an identification stage are integrated onto one chip.

7. Microprocessor system as claimed in claim 1, wherein said system is incorporated into two or more automotive vehicle control systems consisting essentially of the group of brake-by-wire, ABS, TCS, ASMS.

8. Microprocessor system as claimed in claim 7, wherein said system is limited to maintaining the operation of selected safety functions.

9. A microprocessor system for safety-critical control operations, comprising:

a first data processing system;

a second data processing system;

a third data processing system;

a first bypass interconnecting the first and second data processing systems by a first bus and a second bus, respectively;

a second bypass interconnecting the second and third data processing systems by a third bus and the second bus, respectively;

a first comparator connected to the first and second buses;

a second comparator connected to the second and third buses;

a third comparator connected to the first and third buses; and an identification stage connected the first, second and third comparators, wherein an output signal from the third data processing system is checked for correlation with an output signal from only the first and second data processing systems by the identification stage to detect a fault in one of the first, second and third data processing systems and to determine a location of the fault in one of the first, second and third data processing systems.

10. The microprocessor system for safety-critical control operations according to claim 9, wherein the first data processing system includes a first read-only memory, a first random-access memory, a first processing unit and a first input/output unit, wherein the second data processing system includes a second read-only memory, a second random-access memory, and a second processing unit, and wherein the third data processing system includes a third read-only memory, a third random-access memory, a third processing unit and a third input/output unit.

11. The microprocessor system for safety-critical control operations according to claim 10, wherein the second read-only and random-access memories store data that is redundant with respect data stored in the first and third read-only memories and the first and third random-access memories, thereby eliminating the need for a second input/output unit.

12. The microprocessor system for safety-critical control operations according to claim 10, wherein the first bypass enables the first processing unit to read data stored in the second read-only and random-access memories and permit data flow from the first processing unit and the second read-only and random-access memories to the second processing unit.

13. The microprocessor system for safety-critical control operations according to claim 10, wherein the second bypass enables the third processing unit to read data stored in the second read-only and random-access memories and permit data flow from the third processing unit and the second read-only and random-access memories to the second processing unit.

14. The microprocessor system for safety-critical control operations according to claim 9, further comprising a first peripheral connected to the first data processing system.

15. The microprocessor system for safety-critical control operations according to claim 14, further comprising a second peripheral connected to the third data processing system.

16. The microprocessor system as claimed in claim 9, wherein the system is incorporated into two or more automotive vehicle control systems consisting essentially of the group of brake-by-wire, ABS, TCS, ASMS.

* * * * *